July 7, 1942.   G. A. LYON   2,288,725
FENDER SKIRT CONSTRUCTION
Filed Feb. 20, 1939   2 Sheets-Sheet 1
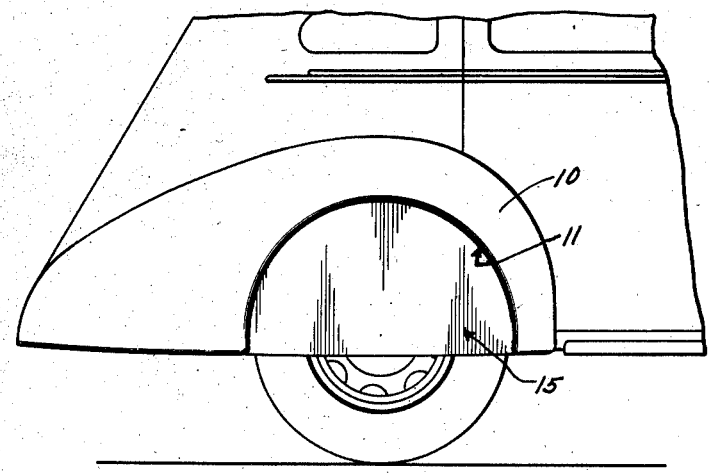
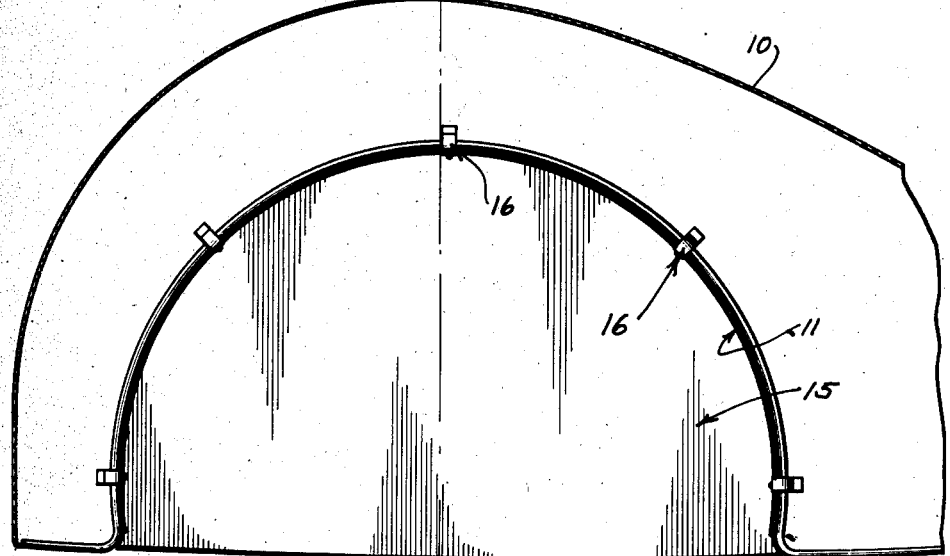
Inventor
George Albert Lyon.
by Charles ... Attys.

July 7, 1942.   G. A. LYON   2,288,725
FENDER SKIRT CONSTRUCTION
Filed Feb. 20, 1939   2 Sheets-Sheet 2
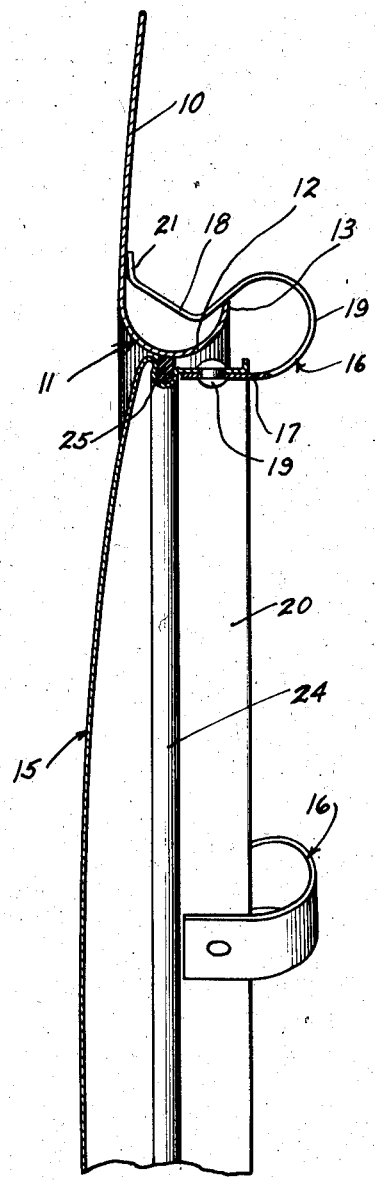
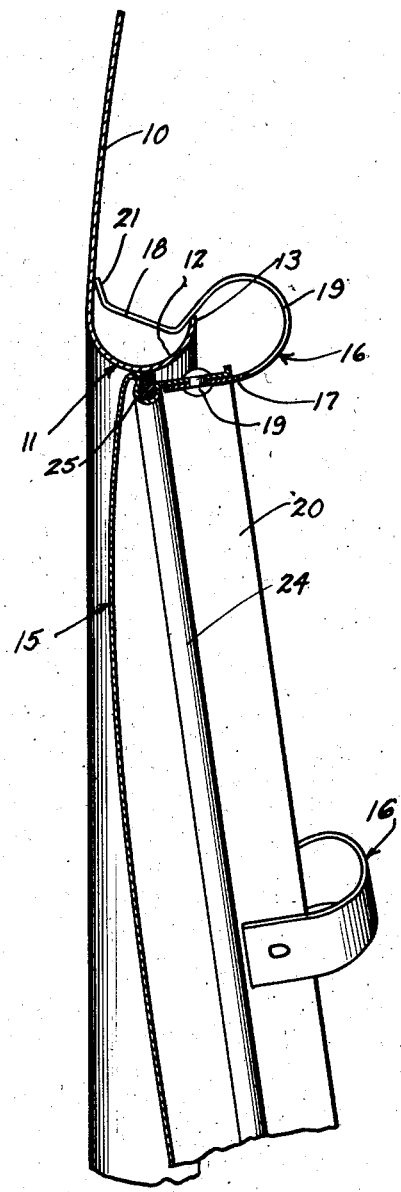
Inventor
GEORGE ALBERT LYON.
by
Attys.

Patented July 7, 1942

2,288,725

UNITED STATES PATENT OFFICE 2,288,725

FENDER SKIRT CONSTRUCTION

George Albert Lyon, Allenhurst, N. J., assignor to Lyon Incorporated, Detroit, Mich., a corporation of Delaware Application February 20, 1939, Serial No. 257,424

2 Claims. (Cl. 280—153)

This invention relates to an automobile fender skirt construction, and more particularly to a novel structure for supporting a fender skirt in a fender opening.

An object of this invention is to provide a simplified structure for supporting a fender skirt in a fender opening.

Another object of this invention is to provide novel spring means for both supporting and retaining the fender skirt in a fender opening.

A further object of this invention relates to the provision of a novel structure for cushioning the fender skirt in a fender opening and for maintaining the cushioning means under compression when the skirt is in position in the opening.

A still further object of the invention relates to the provision of a novel fender skirt which can telescope a fender opening and be supported by concealed means disposed wholly to the rear of the fender skirt.

Another and yet further object of the invention is to provide a fender skirt construction which may be applied from the inner side outwardly through a fender opening and held in place by cooperation with a turned edge defining the fender opening.

In accordance with the general features of this invention, there is provided a structure including a fender having a wheel opening defined by a turned edge, a sheet metal skirt for disposition in the opening so as to telescope the same and having rearwardly extending means hooked over and inside the turned edge and outwardly into contact with the wall of the fender.

Another feature of the invention relates to the construction of the retaining spring elements which are so disposed relative to the skirt and fender opening as to require mounting of the skirt from the inner side of the fender opening in order to dispose the skirt in the opening.

A further feature of the invention relates to the provision of compressible cushioning means on the skirt arranged to be placed under compression by the act of mounting the skirt in the fender opening and held into compression by the retaining means for supporting and retaining the skirt in the opening.

Other objects and features of this invention will more fully appear from the following detailed description taken in connection with the accompanying drawings which illustrate a single embodiment thereof, and in which:

Figure 1 is a fragmentary side view of the rear end of an automobile showing my novel fender skirt applied thereto;

Figure 2 is a fragmentary sectional view looking outwardly at the fender skirt disposed in the opening;

Figure 3 is an enlarged fragmentary cross sectional view taken on the line III—III of Figure 2 looking in the direction indicated by the arrows and showing the skirt in its closed or concealing position; and Figure 4 is a sectional view similar to Figure 3 but showing the position of the skirt as it is being applied from the inner side of the fender to the turned edge defining the fender opening.

As shown on the drawings:

The reference character 10 designates generally the rear fender of an automobile and which fender is provided with the usual fender opening 11 defined by a turned edge 12 formed integral with the wall of the fender. This turned edge 12 has its rearmost extremity 13 turned back upon the fender wall so as to be concealed by the fender wall.

Disposed in the fender opening 11 is a fender skirt designated generally by the reference character 15 and having a shape approximating generally a semi-circle so as to conform with and telescope the fender opening 11. This skirt is provided with a plurality of rearwardly extending spring retaining elements designated generally by the reference character 16. These elements may be of any suitable number, such, for example, as five, as illustrated in Figure 2. Each of these elements includes an axially extending relatively straight leg 17 disposed inside of and secured by rivet 19 to the semi-circular flange 20 formed integral and comprising a portion of the fender skirt 15.

Each of the elements 16 also includes inturned or gooseneck portion 19 extending radially outward from the skirt and having a forwardly extending leg 18, which is in reality turned back upon the leg 17 and is hooked over extremity 13 of the turned fender edge 12.

It will be perceived from Figures 3 and 4 that the leg 18 is angled so that when it is in retaining position it extends inside of the outer groove defined by the turned edge 12 of the fender. In other words, the angled intermediate portion of this leg 19 is disposed radially inward of the outermost extremity 13 of the turned edge 12 so as to support the fender skirt on this edge, as well as to prevent shifting of the skirt rearwardly relative to the turned edge.

In addition to the foregoing, the leg 18 is provided with an outwardly turned outer extremity 21 adapted, when the spring is in retaining position, to bear against the body of the fender wall 10 so as to limit outward displacement of the skirt relative to the fender opening. Thus, this leg 18 of the spring element serves to restrict lateral movement both transversely rearwardly and transversely outwardly relative to the turned edge in addition to supporting the fender skirt on the turned edge. It will, of course, be appreciated that what I have said about the single retaining element 16 is also applicable to all five of the elements illustrated as being applied to the fender skirt.

The fender skirt 15 is also provided with a semicircular groove 24 disposed between the outermost portion of the skirt and the flange 20, in which there is disposed a rubber cushioning bead 25 adapted to be placed under compression when the skirt is telescoped inside of the turned edge 12.

In Figure 3, I have illustrated the position of the skirt when it is supported and retained by the element 16 inside of the fender opening 11. On the other hand, in Figure 4, I have illustrated the manner in which the skirt is applied transversely outwardly to the opening 11. In this application of the skirt to the fender, the uppermost spring is first hooked over the extremity 13 of the turned edge 12, and the skirt is then progressively worked or pressed in a direction outwardly until all of the other spring elements are worked or cammed into a retaining position. It will, of course, be appreciated that due to the construction of the spring the skirt cannot be applied from the outer or face side of the fender to the fender opening but must be applied from the inner or rear side of the fender and then worked outwardly.

After the skirt is in the position shown in Figure 3, it will be appreciated that the rubber bead 25 is under compression so as to establish an anti-rattle fit between the skirt and the fender edge 12. Also, as pointed out hereinbefore, the spring elements not only support the skirt in a vertical direction on the extremity 13 of the turned edge 12, but in addition thereto restrict movement in a horizontal plane both transversely rearwardly and transversely outwardly relative to the fender opening.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fender shield for covering the wheel opening of a vehicle fender having an inturned edge, said shield having an outer peripheral edge which abuts said edge of said fender, the outer face of the fender shield and the outer face of the fender forming a substantially smooth surface, said shield having a welt receiving means about said peripheral edge, a welt disposed in said receiving means, said shield having an inner extending flange adjacent said welt, a reversely bent retaining finger secured to said inner extending flange, said finger being bent to form a stop adapted to engage the inner face of the fender, whereby the shield is mounted on the fender by a movement from the rear towards the front, the stop contacts the inner fender face and thereby locates the shield in the opening.

2. A fender shield for covering the wheel opening of a vehicle fender having an inturned edge, said shield having an outer peripheral edge which abuts said inturned edge of said fender, the outer face of the fender shield and the outer face of the fender forming a substantially smooth surface, said shield having an inner extending flange adjacent said peripheral edge of said shield which abuts said fender, a reversely bent retaining finger secured to said inner extending flange, said finger being bent to form a stop adapted to engage the inner face of the fender, whereby the shield is mounted in the fender by a movement from the rear towards the front, the stop contacts the inner fender face and thereby locates the shield in the opening.

GEORGE ALBERT LYON.